: US007590556B1

United States Patent
Carmichael et al.

(10) Patent No.: US 7,590,556 B1
(45) Date of Patent: Sep. 15, 2009

(54) SYSTEM AND METHOD FOR PROVIDING LIFESTYLE SPECIFIC INFORMATION SERVICES, AND PRODUCTS OVER A GLOBAL COMPUTER NETWORK SUCH AS THE INTERNET

(75) Inventors: Chris Carmichael, Laguna Hills, CA (US); Connie Carmichael, Laguna Hills, CA (US); Greg Crotty, Morris Planes, NJ (US)

(73) Assignee: International Apparel Group, LLC, San Juan Capistrano, CA (US)

( * ) Notice: Subject to any disclaimer, the term of this patent is extended or adjusted under 35 U.S.C. 154(b) by 1213 days.

(21) Appl. No.: 09/645,216

(22) Filed: Aug. 24, 2000

(51) Int. Cl.
*G06Q 30/00* (2006.01)
(52) U.S. Cl. ...................................................... 705/14
(58) Field of Classification Search ................. 705/14, 705/10
See application file for complete search history.

(56) References Cited

U.S. PATENT DOCUMENTS

| 6,014,638 | A | 1/2000 | Burge et al. ................ 705/27 |
| 6,253,188 | B1 * | 6/2001 | Witek et al. ................ 705/14 |
| 6,266,668 | B1 * | 7/2001 | Vanderveldt et al. ......... 707/10 |
| 6,466,918 | B1 * | 10/2002 | Spiegel et al. .............. 705/27 |
| 6,931,402 | B1 * | 8/2005 | Pereira, III ................ 707/9 |
| 6,973,436 | B1 * | 12/2005 | Shkedi ..................... 705/14 |

OTHER PUBLICATIONS

"Physical Networks: Centralise Network Management and Reduce Errors and Costs With CSM 2.5." M2 Presswire, Coventry, p. 1, May 13, 1999.*

* cited by examiner

*Primary Examiner*—Susanna M Diaz
(74) *Attorney, Agent, or Firm*—Law Ofc SC Harris Inc

(57) ABSTRACT

An Internet-based service configured to provide a variety of products, services and information tailored to a specific and known lifestyle, wherein all information provided about those products, services, and information is obtained from one web site configured to meet the needs of only that lifestyle.

10 Claims, 4 Drawing Sheets

SYSTEM AND METHOD FOR PROVIDING LIFESTYLE SPECIFIC INFORMATION SERVICES, AND PRODUCTS OVER A GLOBAL COMPUTER NETWORK SUCH AS THE INTERNET

FIELD OF THE INVENTION

The present invention relates to a business system and method for delivering relevant and useful information that is directed to a particular lifestyle. More particularly, the present invention relates to providing lifestyle specific information, services, and products over a global computer network such as the Internet.

BACKGROUND OF THE INVENTION

The Internet comprises a vast number of computers and computer networks that are interconnected through communication links. The Internet utilizes the TCP/IP suite of protocols, which are well known in the art of computer networking. TCP/IP is an acronym for "Transport Control Protocol/Interface Program," a software protocol developed by the Department of Defense for communication between computers.

The interconnected computers exchange information using various services, such as electronic mail, Gopher, and the World Wide Web ("WWW"). The WWW service allows a server computer systems (i.e., web server or web site) to send graphical web pages of information to a remote client computer system. The remote client computer system can then display the web pages. Each resource, (e.g., computer or web page) of the WWW is uniquely identifiable by a Uniform Resource Locator ("URL"). To view a specific web page, a client computer system specifies the URL for that web page in a request (e.g., a HyperText Transfer Protocol ("HTTP") request). The request is forwarded to the web server that supports that web page. When that web server receives the request, it sends that web page to the client computer system. When the client computer system receives that web page, it typically displays the web page using a browser. A browser is a special-purpose application program that effects the requesting and displaying of web pages.

Currently, web pages are typically defined using HyperText Markup Language ("HTML"). HTML provides a standard set of tags that define how a web page is to be displayed. When a user indicates to the browser to display a web page, the browser sends a request to the server computer system to transfer to the client computer system an HTML document that defines the web page. When the requested HTML document is received by the client computer system, the browser displays the web page as defined by the HTML document. The HTML document contains various tags that control the displaying of text, graphics, controls, and other features. The HTML document may contain URLs of other Web pages and web sites available on that server computer system or other server computer systems.

The World Wide Web has become especially useful for conducting electronic commerce. And it continues to increase its position as an integral place for businesses that offer information, services, and products to potential customers. Popular examples of such businesses are the following: news providers, such as www.cnn.com (Cable News Network), www.wsj.com (Wall Street Journal), and www.businessweek.com (Business Week Magazine); car manufacturers, such as www.ford.com/us (the Ford Motor Company) and www.gm.com (the General Motor Company); book stores, such as www.amazon.com (Amazon.com books) and www.bn.com (Barnes & Noble); and most importantly, Internet portal and search engine sites, such as www.yahoo.com, www.go.com, www.aol.com, and www.msn.com.

Potential customers are turning to the Internet in increasing numbers and particularly to the World Wide Web portion thereof, in order to find answers to questions, to search for products and services, and to gather information relating to any conceivable area of interest. The graphical portion of the World Wide Web is, in fact, comprised of over one hundred million web pages of content with over one million web pages being added every month. Each of those web pages contains information, products, and services that may be extremely valuable and useful to any given potential customer. The problem is that the vastness of the World Wide Web and the enormous amount of information contained within its growing boundary make it very difficult to find targeted information.

Search engines, such as those found at yahoo.com or lycos.com, have been created to help people find relevant information on a topic of interest. A person may type in a subject or key work and generate a list of web sites. A problem, however, with these type of Internet search engines is that it is difficult for them to deal with the vast amount of potential data that may be searched and retrieved. By entering certain keywords into such search engines, unwanted data, in addition to the desired data, may be discovered by the search engine, forcing the user to wade through often useless and unwanted search results in order to get to the desired data. This problem is only getting worse as the amount of data available continues to grow.

Another problem evident on the Internet is that current portals either provide too much information, so that it is difficult and time-consuming for users to obtain what they want, or they provide vertical information targeted to a specific topic and therefore useless with respect to any other subjects of interest. For example, a user can access a large portal, such as www.yahoo.com in order to access information ranging from stock quotes to cars to hotels and airlines. And yahoo.com can be used to find information on a given topic of interest or hobby as well. But the problem with Internet portals, such as yahoo.com, is that they are not targeted to particular lifestyles and, therefore, a search relating to a particular hobby or interest may take some time and perhaps some searching savvy in many cases. On the other hand, a person that is interested in sports, for example, can go to a vertical web site, such as www.espn.com, where he or she will be able to obtain information on all kinds of sports. Information relating to any other area of personal interest, however, cannot be found through that portal.

Currently, there is no avenue for users that have particular lifestyles to obtain useful information online relating to all of the different needs of their lives in a quick, easy, and centralized fashion. Thus, a need exists for Internet portals that are horizontally built around a particular lifestyle and that provide relevant and targeted information relating to all facets of life for people with that lifestyle.

SUMMARY OF THE INVENTION

In one particularly innovative aspect, the present invention is directed toward an Internet-based service, such as a web site, designed to provide a wide spectrum of products and services tailored to a specific and known lifestyle. This service can be a web site designed in a horizontal fashion so that it provides specific information, products and services directed to a specific lifestyle.

For example, an avid outdoorsman enjoys a lifestyle that is different from one whose main interests revolve around cooking and cuisine. The present invention can be a web site that provides products, services and information directed specifically at that individual. The car dealers that are associated with the web site can be those that specialize in SUV's and Jeeps™, for example. The banking institutions provided on the web site can be those that especially cater to outdoorsman, such as those that provide low interest loans for the purchase of SUV's or country estates. The real estate agents provided on the web site can be those that specialize in country estates, mountain properties or the like. Travel agencies provided on the web site can be those that cater especially to the outdoor lifestyle by offering, for example, river rafting tours or mountain climbing expeditions. The clothing retailers provided on the web site can be only those that sell rugged outdoor apparel. The insurance companies that are provided on the web site can be those that offer special programs or services for people who enjoy an active, outdoor lifestyle. The grocery store that is provided on the web site can be one that, for example, sponsors the U.S. cross-country skiing team.

These are all examples to show that the present invention is a unique portal system that is built around a particular lifestyle, and all of the companies that provide products and services through that portal offer unique solutions that could most benefit individuals who enjoy that lifestyle. The products and services may be the same as those offered by other companies, such as with the example of the grocery store, but they have unique characteristics that would appeal to a unique population demographic or lifestyle.

In another particularly innovative aspect, the present invention is directed to an Internet-based service that is configured to design in real time a horizontal web site that provides a wide variety of products and services tailored to a specific and known lifestyle. The tailored products and services are directed at the particular user based on his or her lifestyle and are designed to meet all of his or her needs. Thus, the user need not ever leave the specially designed web site to look for products, services or information unless he or she is looking for something for someone else who enjoys a different lifestyle. Moreover, the products or services offered by a particular provider on the web site need not be unique to the lifestyle so long as the provider embraces or advocates a perspective or ideology that is unique to the lifestyle.

In another particularly innovative aspect, the present invention is directed at a method of providing lifestyle specific information over a global computer network such as the Internet. The method can include the steps of providing a remote computer having a memory and providing a graphical user interface in communication with the remote computer. The memory of the remote computer can have stored therein, one or more data search programs and a number of modules, each module having a number of data structures. The data structures can have information or data directed to the specific needs of a known population demographic. The graphical user interface can be configured to enable a user to search each of the modules for desired information.

The method can further include the step of receiving through the remote computer a request from a member of the demographic to search the contents of one of the modules for information of interest to him or her. The data searching programs can then be used to search one or more of the data structures for information or data representative of the desired information. The data or information that is retrieved by the search programs can be transmitted to the requester over a communication line such as a wide area network or global communications network.

The modules can be directed at specific areas of information, products or services. For example, one module can be an on-line travel agency. The data structures associated with such a module could include data or information about flight schedules, travel tours, airfare pricing, flight paths, and other travel-related information. Another module can be a financial services provider. A third module can include multi-media presentations, such as live video, events coverage, music, movies, and news reports. That or another module can further include streamable video data and audio data to deliver multi-media presentations to a remote user. All of these multi-media presentations can be grouped based on the specific population demographic. Other modules can include an educational module containing information on a wide-variety of topics, each topic being directed at the specific population demographic. Yet another module can be configured to offer various products and services, each being directed at the specific population demographic.

The modules of this aspect of the invention can be connected in a horizontal fashion rather than a vertical fashion. In a horizontal connection, the commonality of the modules is based on the population demographic and its specific needs. A vertical connection, on the other hand, involves a common product or service and does not involve modules that provide products and services beyond that specific product or service. Thus, the modules as a group are directed to a specific population demographic, but include products, services and information that any population would conceivably need or desire.

In another particularly innovative aspect, a system for providing a lifestyle specific web site to a remote user is provided. The system includes a first graphical user interface configured to enable a user to design a lifestyle specific web site, a central processing unit having a memory, such as a network server (e.g., Windows NT v4.0 running IIS 4.0), and a search program in communication with the central processing unit.

The memory can have stored therein a first data structure including a number of graphical user interfaces (GUIs). Each of the GUIs will be designed around a specific lifestyle. For example, a GUI designed for those whose lives revolve around survival sports can be more dynamic with more live-action active server pages and high-energy music (ASPs) incorporated into the GUI. In contrast, a GUI designed for those whose lives revolve around gardening, for example, may have web pages that are mostly static and HTML-oriented with soothing or classical music incorporated into the GUI.

Each lifestyle can be associated with a unique lifestyle identifier, which can be a multi-digit index code in the record of the lifestyle stored in the microprocessor. This will enable the search program to identify a lifestyle based on the unique identifier of the lifestyle.

The search program will be capable of searching the data structure and identifying a lifestyle specific graphical user interface in accordance with instructions provided by a user through the first graphical user interface. The instructions can be provided by the user through a drop-down menu found on the first GUI that allows the user to choose from a list of lifestyles. Each of these lifestyles will connect the user to a GUI in the memory of the central processing unit corresponding to that lifestyle.

Alternatively, the user can be provided with a form having a number of data fields. The data fields will ask for some personal information from the user, such as the user's gender, age, hobbies, occupation, magazines or newspapers that the user subscribes to, marital status, etc. Based on this information, an algorithm can determine the lifestyle of the user and assign one or more unique lifestyle identifiers to the user.

The central processing unit can also have stored therein a data structure having a number of records of web sites or web pages that provide products, services, and information that are categorized according to lifestyle. Each record can have associated therewith one or more lifestyle identifiers that enable the categorization according to lifestyle.

A search program, which can be in the memory of the central processing unit, can further be provided. This search program can be the same program that searches for a lifestyle GUI or it can be a separate and unique search program. In any case, it will be capable of searching the records of web sites and identifying web sites according to their lifestyle identifiers.

BRIEF DESCRIPTION OF THE DRAWINGS

Reference is next made to a brief description of the drawings, which are intended to illustrate systems and methods for providing lifestyle specific information, services, and products over a global computer network such as the Internet. The drawings and detailed descriptions which follow are intended to be merely illustrative and are not intended to limit the scope of the invention as set forth in the appended claims.

DETAILED DESCRIPTION OF THE PREFERRED EMBODIMENT

Figure 1:
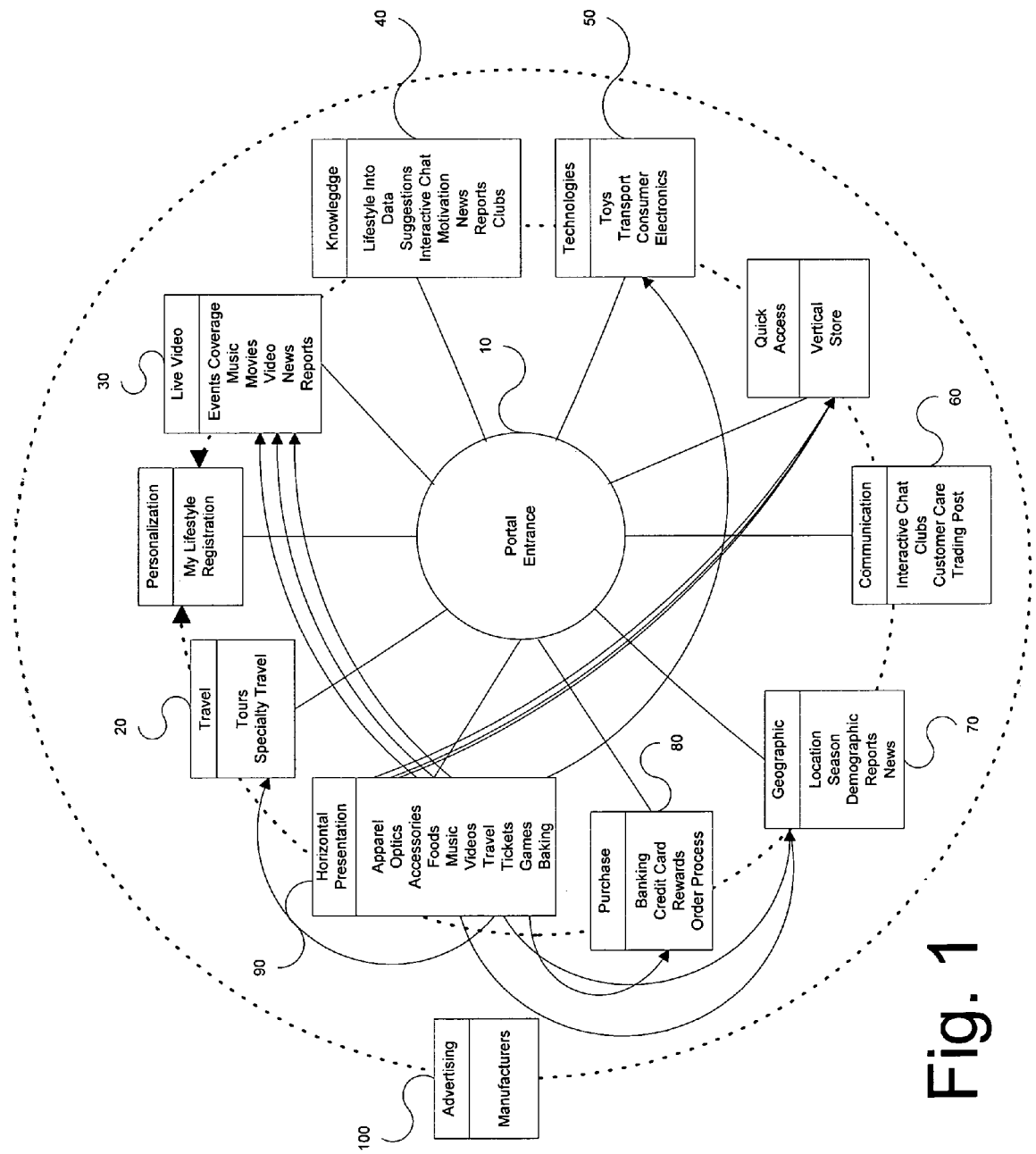
FIG. 1 is a state diagram illustrating an example of services provided by an Internet portal according to one embodiment of the invention.

FIG. 1 illustrates an Internet web site or portal 10 that provides a number of modules. The portal is designed around a known and specific lifestyle. Thus, each of the modules will be connected by a unique lifestyle and will include products and services that most benefit that lifestyle. Moreover, the retailers and service providers available in those modules will share a common ideology that is integral with that lifestyle.

For example, the portal can be directed at those who have a particular interest in generation X sports such as snowboarding, skateboarding, sky-surfing, surfing, white-water rafting, rock-climbing, etc. Their lifestyle is one that is consistent with an interest in such sports, and the portal 10 is consistent with that lifestyle.

For example, the travel module 20 will be tailored to appeal to those with a generation X sports lifestyle. It will provide travel information and tours that include such things as special rates on white-water rafting tours or skydiving adventures.

The multi-media module 30 can include live events coverage of surfing championships or the X Games. The music will include alternative rock and roll, and the movies will be ones that appeal to those who enjoy a generation X sports lifestyle. The news reports provided through the multi-media module 30 will include a disproportionate amount of coverage on topics involving generation X sports.

The knowledge module 40 will include a plethora of information about generation X sports, as well as clubs and interactive chat rooms for people interested in generation X sports.

For example, the chat rooms can be built around different sports, such as chat rooms for surfing aficionados, skydivers, rock-climbers, and skate boarders. The chat rooms can be built around other areas of interest as well, such as music, and there can be chat rooms for fans of, for example, the Red Hot Chili Peppers™ or System of a Down™ (both alternative rock bands).

The technologies module 50 will include various products that are marketed with generation X sports lovers in mind. For example, sports equipment stores that specialize in or have specials on snowboards or wet suites will be represented in this module. Also, search engines will be provided that can search each of the modules, and such products as altimeters for sky-divers can be found in the technologies module 50.

The communication module 60 can be built with the generation X sports lifestyle in mind. For example, the customer care representatives that answer emails or telephone inquiries can be chosen based on their interest level in generation X sports.

The geographic module 70 can include climate and weather reports directed in particular to those areas that are of current interest to generation X sports lovers. For example, if there is a surf competition in Huntington Beach, Calif., the surf conditions and weather report for that city will be included in this module.

The purchase module 80 can include credit card rewards programs aimed at purchases of goods and services directed at the generation X sports lifestyle. The banks showcased on this module can be those that, for example, offer special small business loans to fledgling surf shops or other incentives aimed at this lifestyle.

The entire portal 10 depicted in FIG. 1 is built around a new horizontal presentation system 90. All of the products, services, information, and advertising 100, that is provided through the portal is built around a particular lifestyle and not a particular product or service (vertical orientation). Thus, the products, services, information, and advertising, although they meet all aspects of an individual's needs, all have a common ideology and perspective, which makes the portal 10 unique to a lifestyle.

In the example of the generation X sports lifestyle, a product or service that is provided on the portal does not have to be one that is unique to the lifestyle. For example, an online grocery provider may be included in the horizontal presentation 90. Online grocers are not unique to the lifestyle, but the grocer that is showcased in the portal could be one that further provides a unique service that would be of special interest to those with an interest in generation X sports. For example, the grocer could be one that sponsors the U.S. Snowboarding Team or offers special discounts on energy drinks and electrolyte replenishing liquids, such as Gatorade®. Therefore, although this hypothetical grocer offers goods and services that all people need, it also provides special products or services that no other grocers offer and that appeal to the generation X sports lifestyle.

Figure 4:
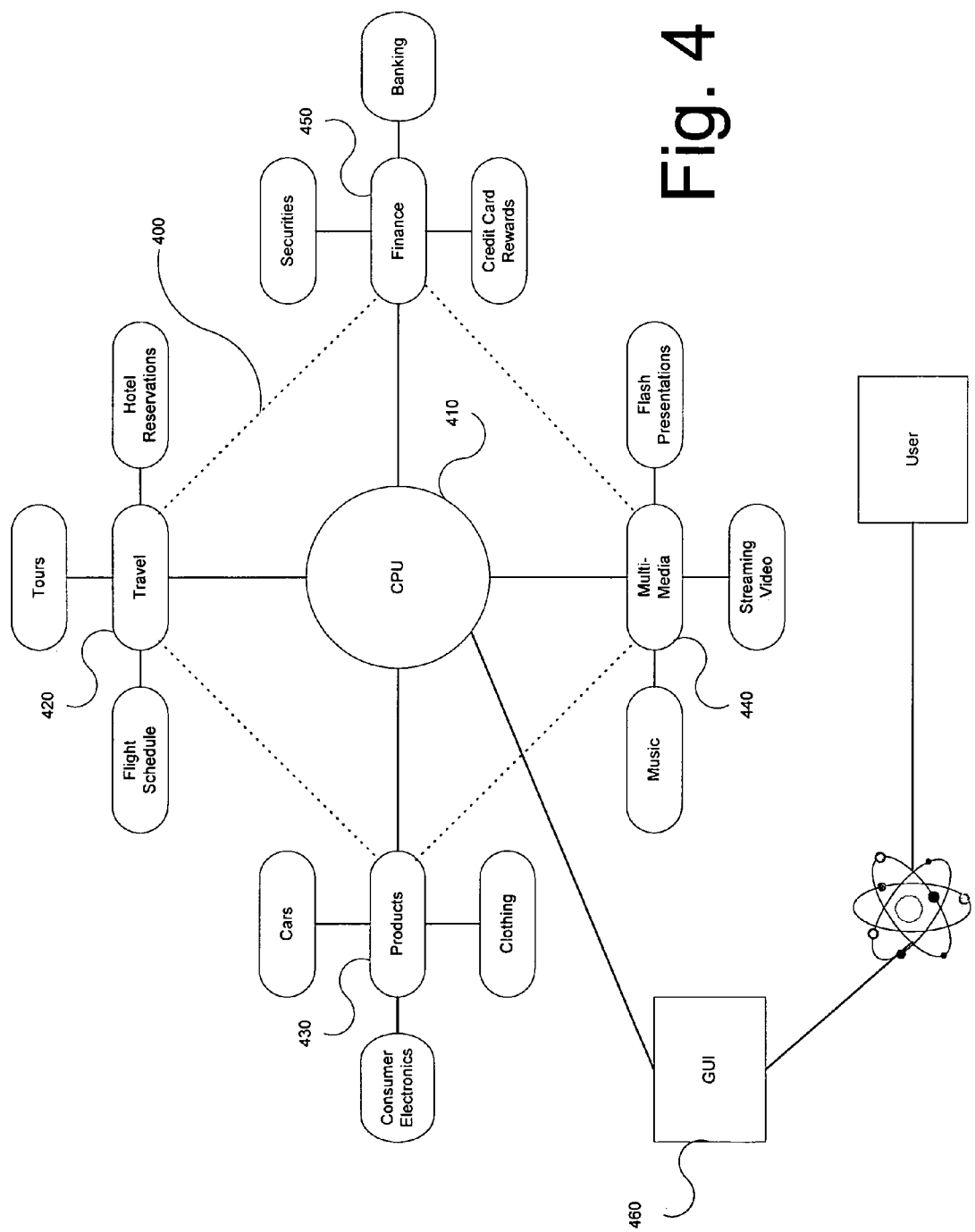
FIG. 4 is a state diagram illustrating an Internet service according to one embodiment of the invention.

Moving on to FIG. 4, it depicts an Internet-based service and a method for delivering lifestyle specific content. In terms of hardware, at the center of the system is a central processing unit 410, which may be of any type of computer system, such as a mainframe, a server-based system (e.g., Windows NT v4.0 running IIS 4.0), a stand-alone microprocessor and the like. In terms of software, at the core of the system and method is a lifestyle identifier 410, which represents a single, known lifestyle and which horizontally links all of the products, services, and information provided by the system.

This architecture enables a method of providing lifestyle specific information over a global computer network, such as the Internet. The method involves providing a remote computer 410 having a memory, data searching programs, and a number of modules or data structures. In the example depicted in FIG. 4, the modules include a travel module 420, a products module 430, a multi-media module 440, and a finance module 450. Other modules can also be added. Each of the modules has at least one thing in common, and that is that each contains information, services, and products that are directed to one particular lifestyle.

Each module includes data that represents or enables a remote user to purchase products or services or obtain information. But the significant aspect is that the products, services and information associated with each module is horizontally linked to the products, services, and information associated with each other module by a specific and known lifestyle, represented by a lifestyle identifier. Everything within the bounds of this Internet service is directed to that one lifestyle.

The Internet service and method depicted in FIG. 4 also includes the step of providing a graphical user interface (GUI) 460. The GUI enables a remote user to navigate through the lifestyle specific web site for desired information, products and services. Also provided are data searching programs (not shown), which allow a remote user to search for desired information, products, and services. This allows a remote user whose interests revolve around a particular lifestyle to interface with a lifestyle specific web site that is developed for that lifestyle and easily request or search for products, services and information without ever having to leave the web site.

The remote user can navigate through individual modules and search them individually, or request global searches through the entirety of the web site. The search programs will search for and find information relevant to the search and transmit the results to the user's computer.

An example of this method and Internet service is a web site that is horizontally developed for the generation X sports lifestyle. The modules would be horizontally linked by the common denominator of the generation X lifestyle. Each product or service associated with each module would be selected, or internally developed with the generation X sports lifestyle in mind. For example, the clothing products associated with the products module 430 would include either internal or external links to sites that market products aimed at the generation X sports enthusiast. You would not find stores like The Men's Wearhouse™ on this site. You would find surf shops and department stores that are advertising specials on clothes that people living a generation X lifestyle would be interested in. The travel module 420 would not include information on, for example, site seeing tours to Florence, Italy. It would, however, include information on hotels that are in cities hosting the X Games™ or a surfing competition.

Furthermore, the products and services can be internally linked and within the generation X lifestyle web site, or can external web sites that are linked to this lifestyle specific web site.

Figure 2:
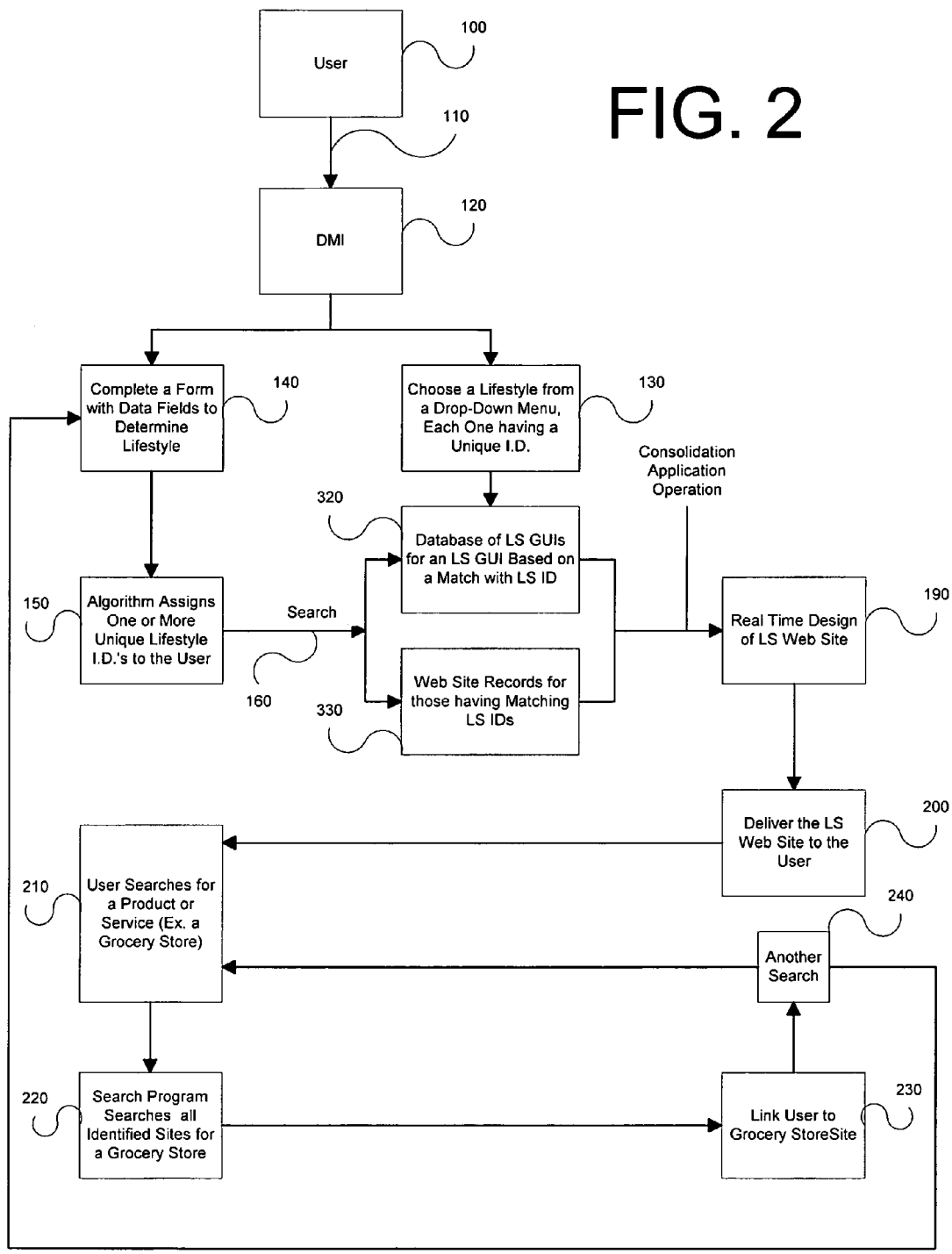
FIG. 2 is a flowchart showing an example of a sequence of steps performed by a computer in accordance with one embodiment of the invention.

Moving back to FIG. 2, it depicts a method, system, and service configured to enable a user to design a lifestyle specific web site in real-time. The user 100 logs on 110 to the service and is provided with a design management interface (DMI) 120. The user 100 can choose a lifestyle from a drop-down menu of lifestyles 130. Each lifestyle has one or more unique identifiers, which can be multi-digit index codes.

Alternatively, the user 100 can complete a form 140 with data fields that request information about the user's lifestyle. For example, the data fields can ask for the user's gender, age, hobbies, occupation, magazines or newspapers that the user subscribes to, marital status, etc. A lifestyle assignment algorithm/program (see FIG. 3) will analyze that information and assign 150 one or more unique lifestyle identifiers to the user. These lifestyle identifiers will match the identifiers associated with the lifestyles from the drop-down menu.

Figure 3:
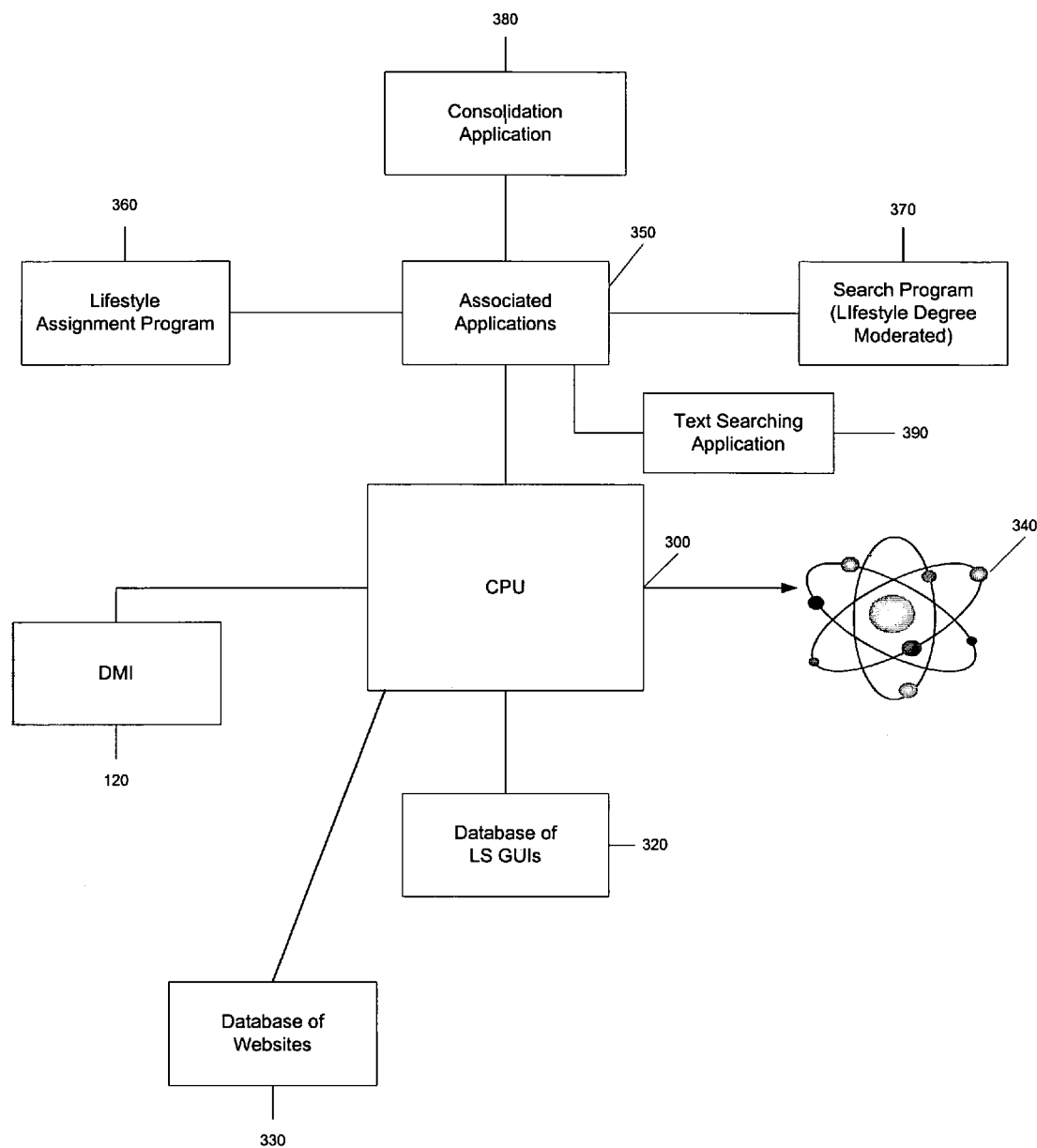
FIG. 3 is a block diagram of the basic architecture in accordance with one embodiment of the invention.

Once the step of assigning a lifestyle to the user has been accomplished, a search program 370 (see FIG. 3) will search 160 (FIG. 2) a database of graphical user interfaces 320 for a graphical user interface that matches the user's lifestyle. As shown in FIG. 3, each of the graphical user interfaces 310 can be stored within the memory of a central processing unit 300.

The lifestyle specific GUIs can be templated. However, for those user's that complete a form 140 rather than choosing a lifestyle from the drop-down menu 130, the ultimate web site will be further tailored to their needs. This is accomplished by the combination of the operation of the lifestyle assignment algorithm/program 360 and the search program 370. If the algorithm decides that the user's information indicates a mix of more than one lifestyle, the algorithm can apply more than one identifier to the user. It can also further personalize the user's lifestyle by configuring degrees to each identifier. The identifier with the highest associated degree will be used by the search program 370 to choose a lifestyle specific GUI from the database of LS GUIs 320.

The search program will also search 180 (FIG. 2) the database of web sites 330 for web site records that correspond with the unique identifiers assigned to the user by the lifestyle assignment algorithm 360.

A consolidation application or personalization engine 380 can be used to ultimately design the lifestyle specific web site. The consolidation application 380 can be a stand-alone application or one that is part of the search or lifestyle assignment programs. It is used to fuse 190 the LS GUI with the identified web sites, to create a lifestyle specific web site for the user in real time. The resulting web site is one that is customized to a particular lifestyle, which is fine-tuned to the user's personal lifestyle.

After the web site is delivered to the user's computer screen 200 (FIG. 2), a user can search for products and/or services 210 associated with the web site. Either the search program 370 or another text-searching program 390 can be used to search 220 for the product or service. For example, a Boolean-based application can be used to carry out these searches. Once the product or service is found, the user is linked to it or is provided a means of linking to it 230. Finally, the user can query another search 240.

FIG. 3 further details the architecture of a system that is capable of carrying out the above operations and providing a remote user with a lifestyle specific portal or web site. The system includes a central processing unit 300, which can interface with remote users via a global communications network 340. The central processing unit 300 may be of any type of computer system, such as a mainframe, a server-based system (e.g., Windows NT v4.0 running IIS 4.0), a stand-alone microprocessor and the like. Of particular significance is that the CPU maintains a number of databases including a database of web sites or intranet sites 330, a database of graphical user interfaces 320, a design management interface 120, and a group of associated applications 350.

The associated applications 350 include a lifestyle assignment algorithm or program 360, a search program 370 for searching for lifestyle identifiers, a consolidation application 380, and a text searching application 390. These applications can be part of one larger program or can be discrete applications.

While the invention is susceptible to various modifications and alternative forms, specific examples thereof have been shown by way of example in the drawings and are herein described in detail. It should be understood, however, that the invention is not to be limited to the particular forms or methods disclosed, but to the contrary, the invention is to cover all modifications, equivalents, and alternatives falling within the spirit and scope of the appended claims.

We claim:

1. A method of providing lifestyle specific information over a global computer network, said method comprising the steps of:

storing one or more data searching programs and a plurality of modules in a memory of a computer, each module comprising a plurality of data structures, wherein the data structures comprise data, and wherein the data of each of said plurality of data structures of each of said modules is directed to the specific interests of a first population group, such that a first module provides data for a first population group of first characteristics and interests, and said second module provides data for a second population group of second characteristics and interests different than said first population group;

using the computer to display a graphical user interface, wherein said graphical user interface includes controls which search each of the modules for desired information based on an entered search term;

receiving, using the computer, a request from a member of one of the population groups;

using an indication of said one population group to select at least one of said plurality of modules associated with said one population group;

using the request to search, by the computer, the contents of one of the plurality of modules for information of interest that are based on both said request and said indication, said information of interest returning data representative of the desired information based on both the entered search term and also on said module selected by said population group; and transmitting, using a computer, said data to the requesting member;

wherein a first of said modules is for products for said first group, a second of said modules is for services for the first group, a third of said modules provides information for said first group;

wherein a fourth of said modules is for products for said second group, a fifth of said modules is for services for the second group, and a sixth of said modules provides information for said second group;

wherein said searching comprises determining first interests of a first member, and returning information only from modules which match the first interests of the member that also match to said search; and determining second interests of a second member, said second interests being different from said first interests, for the same search and returning information only from modules which specify said second interests.

2. The method of claim 1, wherein a first one of said plurality of modules comprises information relating to world travel.

3. The method of claim 2, wherein a first data structure of said first module includes data comprising flight schedules.

4. The method of claim 3, wherein a second data structure of said module comprises data about travel tours.

5. The method of claim 2, wherein a second one of said plurality of modules comprises multi-media presentations.

6. The method of claim 5, wherein a first data structure of said second module comprises streamable video data.

7. The method claim 6, wherein a second data structure of said second module comprises audio data.

8. The method of claim 1, wherein the population group is determined by a known and specific lifestyle that represents an interest that is shared by a group of different people.

9. The method of claim 8, wherein the lifestyle is characterized by an interest in sports.

10. A method as in claim 1, further comprising determining the interests, and representing said interests by a unique identifier of lifestyle associated with the interests, and using said identifier as part of said searching to return only information indicative of said interests.

* * * * *